US000001238H

United States Statutory Invention Registration [19]

[11] Reg. Number: H1238

Duncan

[43] Published: Oct. 5, 1993

[54] SUSPENSION FOR AN OSCILLATING AXLE

[75] Inventor: Michael R. Duncan, Yorkville, Ill.

[73] Assignee: Caterpillar Inc., Peoria, Ill.

[21] Appl. No.: 28,706

[22] Filed: Mar. 8, 1993

[51] Int. Cl.[5] ..... B60G 1/00

[52] U.S. Cl. ..... 280/688; 280/111

[58] Field of Search ..... 280/111, 688

*Primary Examiner*—David H. Brown

*Attorney, Agent, or Firm*—William C. Perry

[57] ABSTRACT

Vehicles that are frequently operated in "off road" conditions are normally equipped with a means by which some form of oscillation is provided to accommodate the uneven terrain over which it traverses. In some instances, the stability of the vehicle is inadequate while in other instances the stability is acceptable; however, the service life of the particular design is in question. The axle suspension 10 of the present invention is mounted to the vehicle frame 12 in a manner whereby the various types of forces encountered during the operation of the vehicle are directed to specific areas of the mounting. Being so directed, the mounting members 38 and 52, utilized in these specific areas of mounting, may be selected to best accommodate the type of loading that will be applied in that area.

1 Claim, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SUSPENSION FOR AN OSCILLATING AXLE

DESCRIPTION

1. Technical Field

This invention relates to the mounting of an axle assembly to a vehicle and more particularly to suspension of an oscillating axle to a vehicle.

2. Background Art

In the operation of off-road vehicles such as log skidders, the ground over which they must traverse is more often than not very uneven. In order to accommodate the uneven terrain, the vehicles are provided with oscillating axles or frames that rotate with respect to each other about a generally horizontal axis. With the various types of suspensions that are available, the level of stability of each particular vehicle is known to fluctuate a great deal.

One of the more stable vehicles utilizes an axle suspension known as a "walking beam". This type of suspension utilizes a transverse beam that has an an inverted "U" shape and cradles the housing of an axle assembly. The beam defines a pair of mounting flanges that extend upwardly from the beam and are offset to the front and rear of the axle assembly by an equal distance. The flanges engage a pair of brackets that are formed on the vehicle frame and are mounted thereto by a pair of pin assemblies. The pin assemblies each include self-aligning spherical bearings that accommodate all of the forces that are generated by the operation of the axles and are transmitted into the vehicle frame. The forces generated by the operation of the axles are two-fold. The oscillation of the axle housing with respect to the frame is prone to cause contact between the two structures which in turn creates a radially directed force. In addition, the reaction of the tires with respect to the ground creates an axially directed force due to vehicle acceleration and wheel slip. Both types of forces are transmitted to the vehicle frame through the spherical bearings and, since the bearings are equidistantly spaced on either side of the axle, the loads are also generally equally shared between the two bearing assemblies. A problem arises with this design in the utilization of a spherical bearing to accommodate both types of forces. While a spherical bearing is designed to accommodate a substantial amount of radial loading, it is not designed to tolerate the amount of axial loading that is created in the above described application. As a result, a design as described above is often the subject of bearing failure which leads to undue service and vehicle downtime.

The present invention is directed to overcoming one or more of the problems as set forth above.

DISCLOSURE OF THE INVENTION

In one aspect of the present invention an axle suspension is provided for a vehicle that has a frame and an axle mounted to the frame for transverse oscillation with respect thereto. An axle frame assembly is included that has a first mounting flange extending upwardly therefrom in generally vertical alignment with the axle and a second mounting flange extending forwardly and upwardly with respect to the axle. A first and second means for mounting the axle frame assembly to the vehicle frame is included. The first mounting means is engaged with the first mounting flange and is sufficient for accommodating the majority of the radially directed loads that are transferred between the axle and the vehicle frame. The second mounting means is engaged with the second mounting flange and is sufficient for accommodating a majority of the thrust loads that are transferred between the axle and the vehicle frame.

With the mounting arrangement set forth above, the positioning of the mounting flanges dictates the paths that the various forces will travel. By doing so, the radial forces may be isolated and a bearing specifically designed to accommodate those forces may be utilized in the mounting. Likewise, a bearing assembly that is specifically designed to handle thrust loading may be utilized in the other mounting and thereby optimizing the load carrying capabilities of the entire mounting arrangement.

BEST MODE FOR CARRYING OUT THE INVENTION

Figure 1:
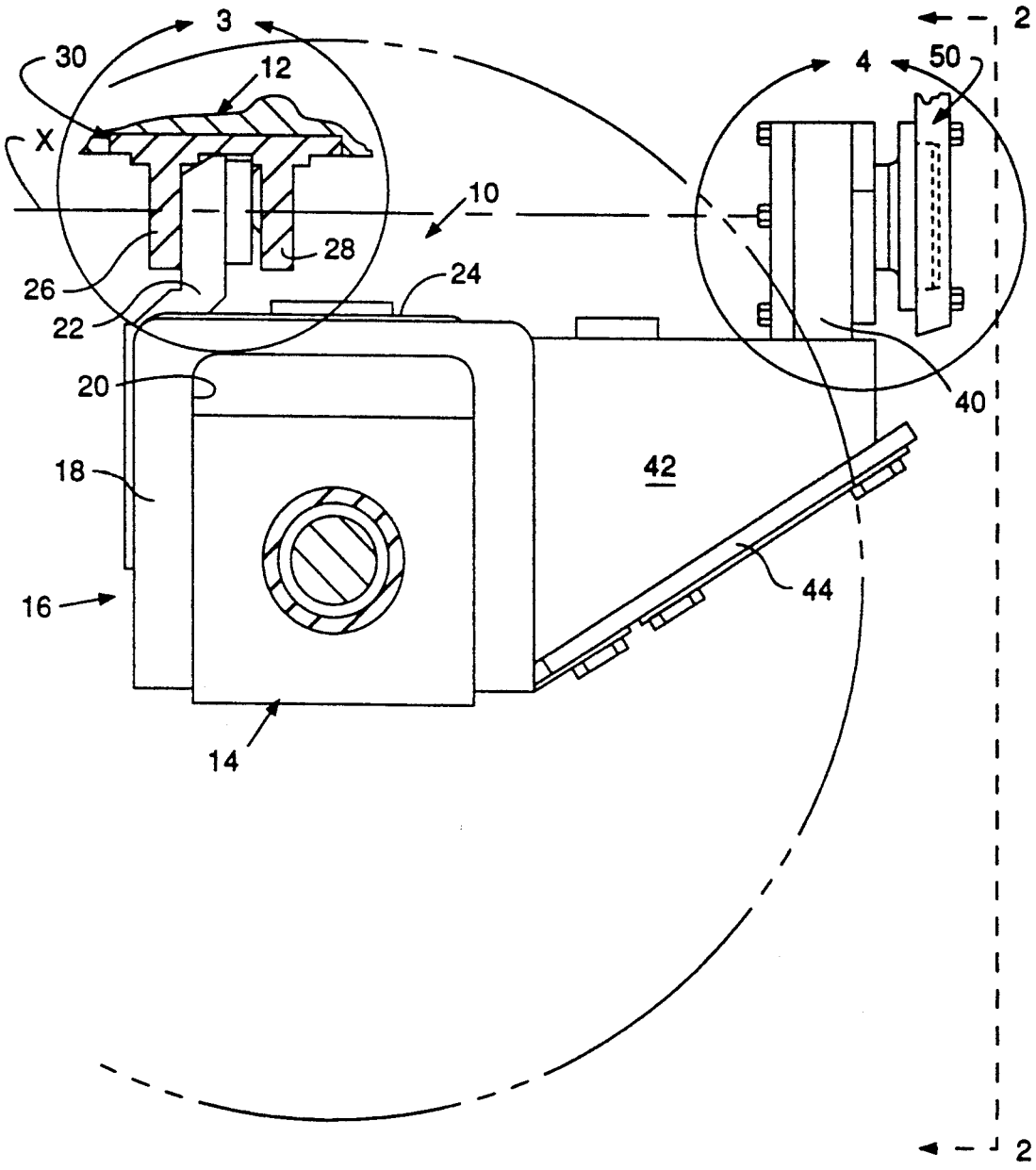
FIG. 1 is a diagrammatic partial side view of an axle suspension that embodies the principles of the present invention.

Referring now to the drawings, it can be seen that an axle suspension 10 is mounted to the frame 12 of a vehicle for transverse oscillation with respect to the longitudinal centerline of the vehicle. The axle suspension is mounted for oscillation about a centerline X that is coincident with the longitudinal centerline of the vehicle.

The axle suspension 10 includes an axle housing 14 and an axle frame assembly 16. The axle housing 14 encloses a number of the drive line components (not shown) that transfer rotation from a centrally located drive shaft to the wheels on each side of the axle housing. These components normally include the differential and a pair of axle shafts. The axle frame assembly defines a cradle portion 18 that defines a cavity 20 that is shaped like an inverted "U". The cradle portion 18 is sufficient for receiving and retaining the axle housing 14. A first mounting flange 22 is fixed to an upper surface 24 of the cradle portion 18 and extends upwardly therefrom. The first mounting flange is centered on the cradle portion and is coincident with the longitudinal centerline X and is positioned to be generally in vertical alignment with the axle housing 14. The first mounting flange is positioned between a pair of downwardly directed mounting plates 26 and 28 that are formed by a rear mounting bracket 30 that is secured to the vehicle frame 12. The first mounting flange 22 and the mounting plates 26 and 28 respectively define a plurality of aligned bores 32, 34, and 36. The aligned bores 32, 34, and 36 are sufficient to receive a spherical bearing assembly 38 that will be described in greater detail hereinafter.

Figure 4:
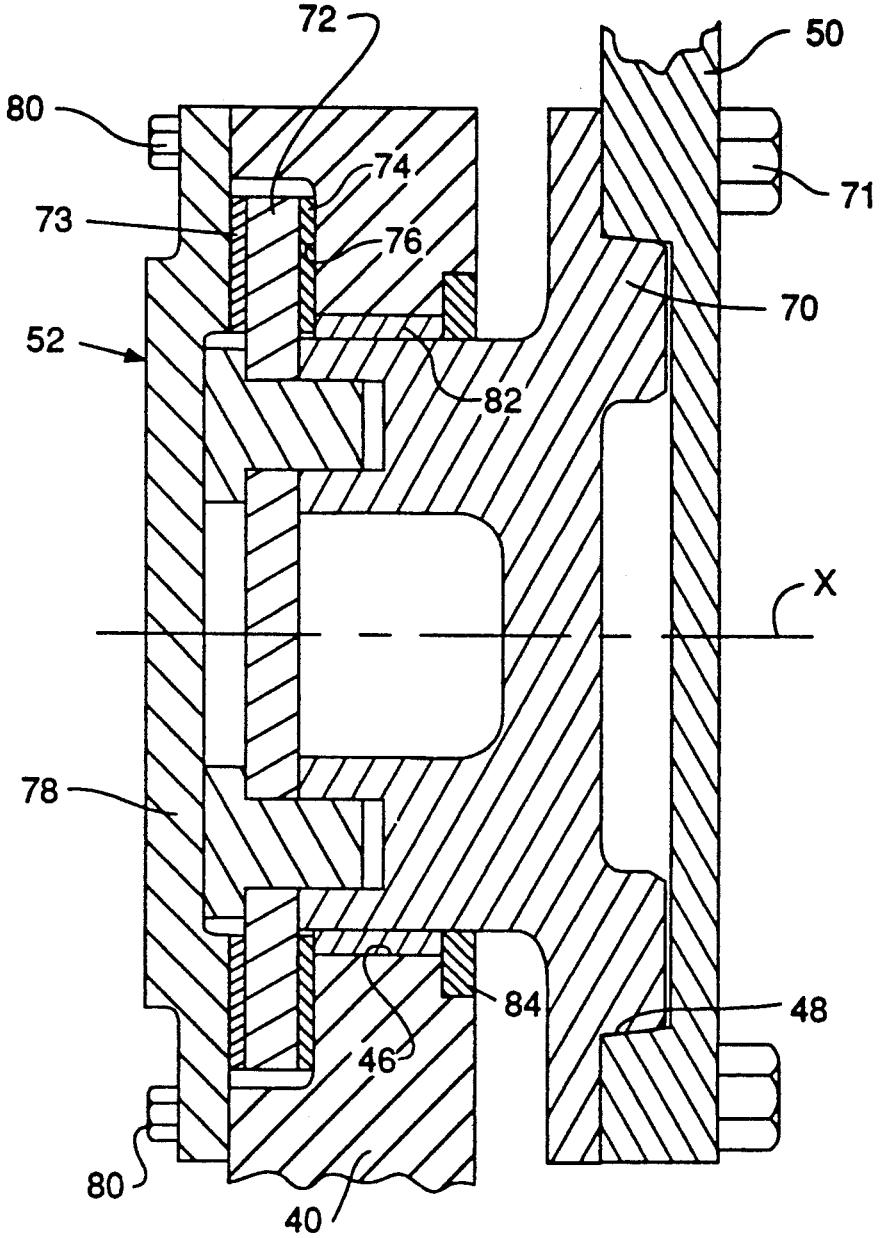
FIG. 4 is an enlarged diagrammatic sectional view of the area indicated at 4 of FIG. 1.

A second mounting flange 40 is positioned forwardly of the cradle member 18 and is secured thereto by a plurality of fabricated braces, two of which, 42 and 44, are shown in FIG. 1. The second mounting flange is positioned on the cradle member so that it is in horizontal alignment with the first mounting flange 22 along the longitudinal centerline X. The second mounting flange defines a bore 46 (FIG. 4) that is alignable with a bore 48 defined by a forwardly positioned mounting bracket 50. The aligned bores 46 and 48 are sufficient for receiving a thrust bearing assembly 52 that will also be described in greater detail hereinafter.

Figure 2:
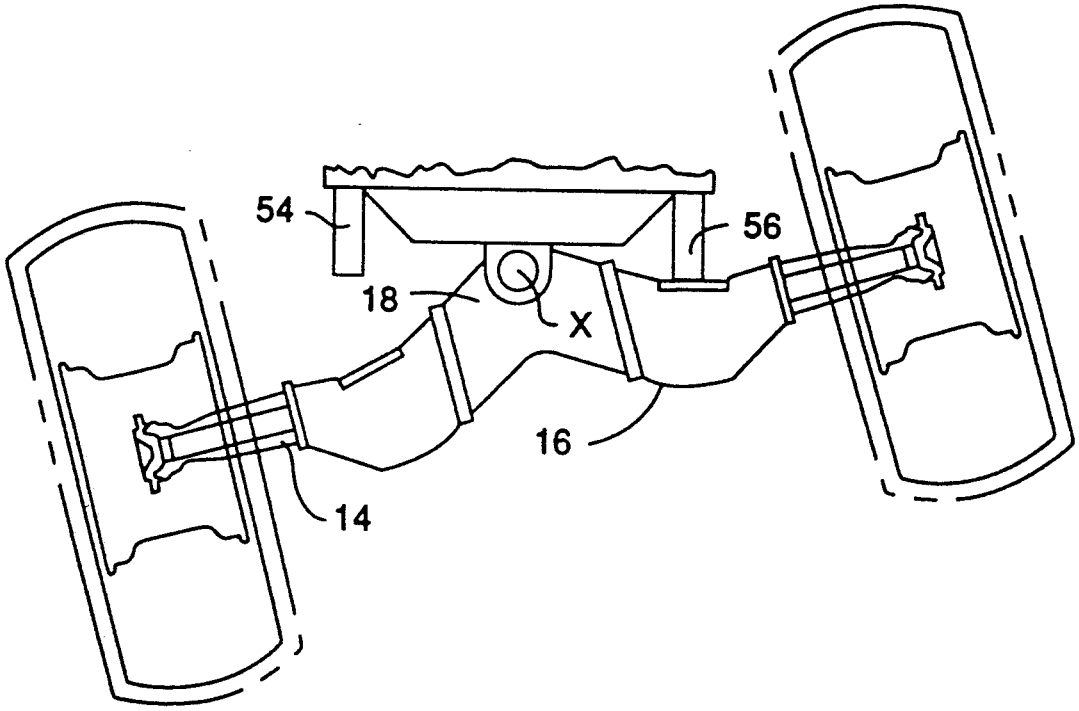
FIG. 2 is a diagrammatic partial front view of the axle suspension taken along lines 2—2 of FIG. 1.

As can be seen in FIG. 2, the mounting between the axle frame assembly 16 and the vehicle frame 12 allows the axle frame assembly 16 to oscillate with respect to the frame (phantom line position) about the longitudinal centerline X. The amount of oscillation is limited by the contact of the axle frame assembly 16 with a pair of frame rails 54 and 56 that are positioned equi-distantly on opposite sides of the centerline X.

Figure 3:
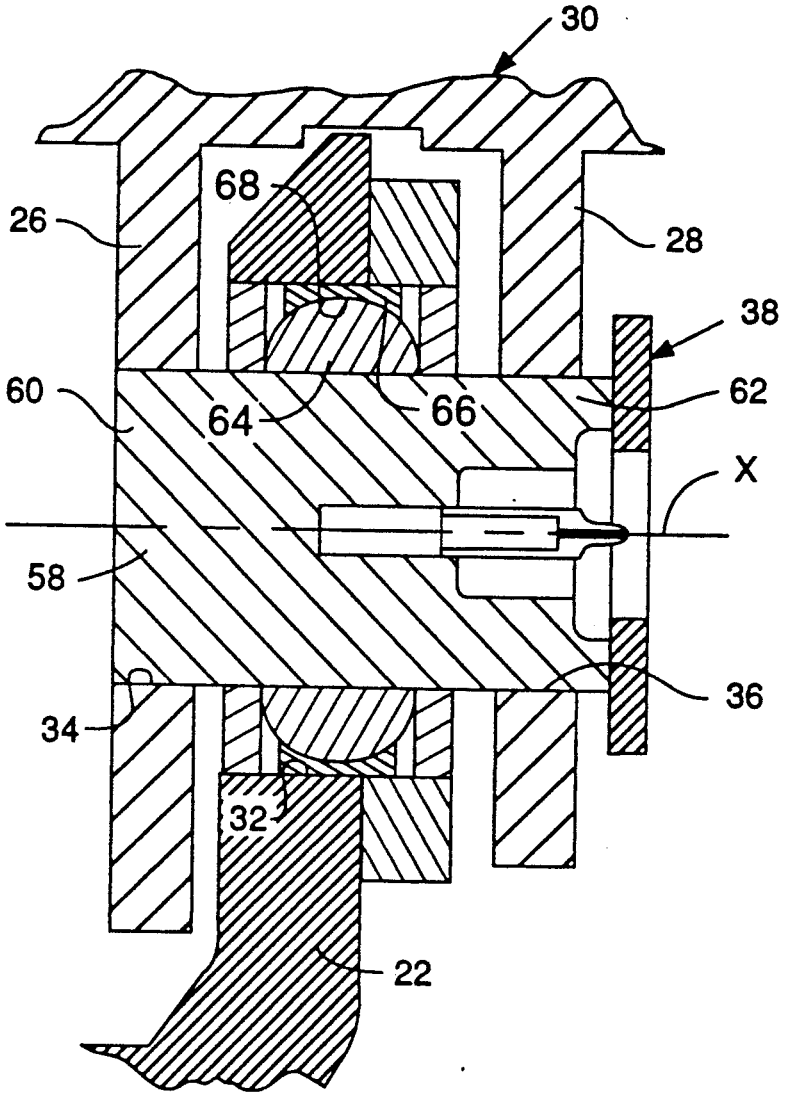
FIG. 3 is an enlarged diagrammatic sectional view of the area indicated at 3 of FIG. 1.

The spherical bearing assembly 38 associated with the first mounting flange 22 is shown in greater detail in FIG. 3. The spherical bearing assembly is of the commonly known variety and includes a pin member 58 that is positioned in the aligned bores 32, 34, and 36 defined respectively by the mounting flange 22 and the mounting plates 26 and 28 of the bracket 30. The pin member 58 has a first and second end portion 60 and 62 that are respectively fixed to the mounting plates 26 and 28. The pin member further defines a spherical portion 64 that is positioned within the bore 32 defined by the first flange member 22. A split bushing 66 is secured within the bore 32 and defines a spherical surface 68 that bears against the spherical portion 64 defined by the pin member to permit relative rotation therebetween.

The thrust bearing assembly 52 (FIG. 4) includes a trunnion member 70 that is fastened to the mounting bracket 50 by a plurality of bolts 71 and is positioned within the aligned bores 46 and 48. A thrust plate 72, is sandwiched between a pair of thrust washers 73 and 74, and the thrust washers 73 and 74 are in turn captured between an inner surface 76 of the mounting flange 40 and a cover plate 78 that is fastened to the second mounting flange 40 by a plurality of bolts 80. A sleeve bearing 82 is positioned in the bore 46 to accommodate relative rotation between the trunnion 70 and the second mounting flange 40. The sleeve bearing 82 is held in place by a retainer 84 that is secured to the second mounting flange 40 by interference fit or other suitable method. The relative rotation permitted in the thrust bearing assembly 52 works in conjunction with the relative rotation accommodated in the spherical bearing to permit the entire axle suspension system to oscillate about the centerline X with respect to the vehicle frame.

Industrial Applicability

In operation, as the vehicle moves over uneven terrain, the axle suspension 10 is allowed to pivot in a transverse direction with respect to the vehicle, about its mounting to the vehicle frame. The axle suspension is allowed to oscillate approximately 15 degrees to each side of the vehicle before the cradle contacts one of the frame rails 54 or 56. In many instances, this contact can be rather severe, sending relatively high radial forces from the axle frame 16 into the vehicle frame 12. Naturally, these forces are passed through the mounting points between the cradle 18 and the vehicle frame 12. With the mounting arrangement set forth above, the first flange 22 member is positioned substantially in vertical alignment with the axle housing. Being so positioned, the majority of the radially directed forces are directed toward this mounting point. Since this mounting point utilizes a spherical bearing assembly 38, it is extremely capable of handling the forces that are directed through it.

Another force that is created between the axle suspension 10 and the vehicle frame 12 are axial forces. Axial forces can be created during acceleration of the vehicle or during times when traction is momentarily lost and the wheels spin with respect to the ground. These forces are referred to as thrust loads and act between the axle frame assembly and the frame in a generally horizontal direction. Since the second mounting flange 40 is positioned forwardly of the axle housing 14, the thrust loads are "directed" toward this point of connection. Since the mounting between the second mounting flange 40 and the vehicle frame 12 includes a thrust bearing, it is specifically designed to accommodate this type of loading.

Thus, it can be seen that an axle suspension 10 as set forth above provides a mounting system that is specifically spaced to direct the various types of loading encountered in the operation of a vehicle to specific points of attachment. In doing so, each mounting point is provided with a specific type of bearing structure that is best suited to accommodate a particular type of loading. This ultimately results in providing a vehicle with an axle suspension assembly that exhibits superior stability while at the same time provides exceptional service life as well.

I claim:

1. In a vehicle having a frame and an axle mounted to the frame for transverse oscillation with respect thereto, an axle suspension comprising:

an axle frame assembly having a first mounting flange extending upwardly therefrom in generally vertical alignment with the axle and a second mounting flange extending forwardly and upwardly with respect to the axle;

a first means for mounting the axle frame assembly to the vehicle frame, said first mounting means being engaged with the first mounting flange and being sufficient for accommodating the majority of the radially directed loads that are transferred between the axle and the vehicle frame; and a second means for mounting the axle frame assembly to the vehicle frame, said second mounting means being engaged with the second mounting flange and being sufficient for accommodating the majority of the thrust loads that are transferred between the axle and the vehicle frame.

* * * * *